(12) United States Patent
Winn et al.

(10) Patent No.: US 10,789,111 B2
(45) Date of Patent: Sep. 29, 2020

(54) MESSAGE ORIENTED MIDDLEWARE WITH INTEGRATED RULES ENGINE

(71) Applicant: International Business Machines Corporation, Armonk, NY (US)

(72) Inventors: Geoffrey Winn, Fair Oak (GB); Neil G. Young, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/285,135

(22) Filed: Feb. 25, 2019

(65) Prior Publication Data

US 2019/0258534 A1 Aug. 22, 2019

Related U.S. Application Data

(63) Continuation of application No. 13/173,052, filed on Jun. 30, 2011, now Pat. No. 10,216,553.

(51) Int. Cl.
    G06F 9/54 (2006.01)
    H04L 29/08 (2006.01)
    H04L 29/06 (2006.01)

(52) U.S. Cl.
    CPC .............. *G06F 9/544* (2013.01); *G06F 9/546* (2013.01); *G06F 2209/547* (2013.01); *H04L 29/06* (2013.01); *H04L 67/1097* (2013.01)

(58) Field of Classification Search
    CPC ...... G06F 9/544; H04L 67/1097; H04L 29/06
    See application file for complete search history.

(56) References Cited

U.S. PATENT DOCUMENTS

| 5,434,975 A ‡ | 7/1995 | Allen ..................... G06F 9/544 719/312 |
| 5,465,329 A ‡ | 11/1995 | Whisler ................ G06F 3/0601 700/245 |
| 6,505,229 B1 ‡ | 1/2003 | Turner .................. G06F 9/3851 718/107 |

(Continued)

OTHER PUBLICATIONS

Krieger, et al., "The Emergence of Distributed Component Platforms," IEEE, Computer, vol. 31, Issue 3, Mar. 1998, 11 pages.

(Continued)

*Primary Examiner* — Larry T Mackall
(74) *Attorney, Agent, or Firm* — Christopher M. Pignato

(57) ABSTRACT

Embodiments of the present invention provide a method, system and computer program product for the integration of a rules engine with message oriented middleware. In an embodiment of the invention, a method for managing a messaging component in message oriented middleware has been provided. The method includes creating shared memory in the memory of a computer and adding or deleting tokens in the shared memory corresponding to objects such as messages and message queues, created in and removed from, respectively, in a messaging component of message oriented middleware. The method additionally includes applying rules in a rules engine to the tokens in the shared memory. Finally, the method includes directing management operations in the messaging component responsive to the applied rules by the rules engine.

6 Claims, 3 Drawing Sheets

(56) References Cited

U.S. PATENT DOCUMENTS

| | | | |
|---|---|---|---|
| 6,847,991 B1 ‡ | 1/2005 | Kurapati | G06F 9/544 709/213 |
| 6,954,933 B2 ‡ | 10/2005 | Stall | G06F 9/451 719/31 |
| 7,240,089 B2 ‡ | 7/2007 | Boudreau | G06F 9/546 709/20 |
| 7,363,630 B2 | 4/2008 | Berkman | |
| 7,590,138 B2 ‡ | 9/2009 | Benard et al. | G06F 9/542 370/43 |
| 7,664,818 B2 ‡ | 2/2010 | Wolber et al. | G06F 9/465 709/20 |
| 7,664,867 B2 ‡ | 2/2010 | Lockhart, Jr. | H04L 67/02 370/229 |
| 7,788,716 B2 | 8/2010 | Dapkus | |
| 8,171,099 B1 | 5/2012 | Malmskog | |
| 10,140,166 B2 | 11/2018 | Winn | |
| 10,216,553 B2 | 2/2019 | Winn | |
| 2001/0034782 A1 ‡ | 10/2001 | Kinkade | H04L 29/06 709/213 |
| 2002/0129274 A1 ‡ | 9/2002 | Baskey | G06F 9/544 713/201 |
| 2002/0144006 A1 ‡ | 10/2002 | Cranston | G06F 9/544 719/312 |
| 2003/0023774 A1 | 1/2003 | Gladstone | |
| 2003/0069939 A1 ‡ | 4/2003 | Russell | G06F 15/167 709/214 |
| 2003/0105778 A1 ‡ | 6/2003 | Andani | H04L 12/2805 |
| 2005/0047425 A1 | 3/2005 | Liu | |
| 2007/0124306 A1 | 5/2007 | Nelson | |
| 2007/0288931 A1 | 12/2007 | Avkarogullari | |
| 2008/0177690 A1 | 7/2008 | Vescovi | |
| 2009/0037929 A1 ‡ | 2/2009 | Shimko | G06F 21/606 719/312 |
| 2009/0157586 A1 | 6/2009 | Zhang | |
| 2009/0198954 A1 ‡ | 8/2009 | Sanders | G06F 17/30241 711/212 |
| 2010/0312729 A1 | 12/2010 | Chen | |
| 2014/0053280 A1 | 2/2014 | Durazzo | |
| 2019/0073249 A1 | 3/2019 | Winn | |

OTHER PUBLICATIONS

McCall, et al., "Supporting Communication of Heterogeneous Distributed Agents With Agenda Management Systems," Department of Computer Science, University of Massachusetts, Amherst, MA, Jan. 2000, 42 pages.

Rajasekar, et al., "Applying Rules as Policies for Large-Scale Data Sharing," ISMS '10: Proceedings of the 2010 International Conference on Intelligent Systems, Modelling and Simulation, Jan. 2010, Abstract only, pp. 322-327.

Jung et al., "Design of Mobile MOM: Message Oriented Middleware Service for Mobile Computing", Proceedings of the 1999 ICPP Workshops on Collaboration and Mobile computing (CMC'99), IEEE, 1999, 6 pages, <http://ieeexplore.ieee.orgxplfreeabs_all.jsp?arnumber=800097.

Ulrich, William M. "Achieving E-Business Integration", Software Mag.com, The IT Software Journal, Sponsored Supplement Feature (Aug. 2011), 10 pages, <https://web.archive.org/web/20050205014126/http://www.softwaremag.com/l.cfm?doc=2001-081e-businessintegration>.

‡ imported from a related application

MESSAGE ORIENTED MIDDLEWARE WITH INTEGRATED RULES ENGINE

CROSS-REFERENCE TO RELATED APPLICATIONS

This application is a Continuation of U.S. application Ser. No. 13/173,052, filed Jun. 30, 2011, the entirety of which is incorporated herein by reference.

BACKGROUND OF THE INVENTION

Field of the Invention

The present invention relates to message passing and more particularly to message passing in message oriented middleware.

Description of the Related Art

Message oriented middleware refers to a programmatic infrastructure that supports the exchange of messages between distributed computing systems. In this regard, the message brokering operability of message oriented middleware allows application modules to be distributed over heterogeneous platforms while communicating through message queues managed by a messaging component and reduces the complexity of developing applications that span multiple operating systems and network protocols. In this regard, the message oriented middleware creates a distributed communications layer that insulates the application developer from the details of the various operating system and network interfaces.

Typically, in the simplest form, administration of message oriented middleware takes the form of embedded commands provided by the message oriented middleware that allows a system administrator to create and modify properties of the messaging component. With access to a set of embedded commands, the system administrator then can decide which properties of the messaging component to modify and when. With this type of setup, the administrator needs only a basic understanding of the messaging component of the message oriented middleware. Further, this type of administration generally works on a small scale. However, it is widely understood that message oriented middleware administration through embedded commands scales poorly in a multi-message component deployment.

The deployment of a management infrastructure tool such as a rules engine seeks to address the lack of scalability in the above-mentioned approach. A rules engine interacts with message oriented middleware through interprocess communications in order to retrieve operational characteristics of the middleware including message puts and gets, and provides operational directives through interprocess communications to the middleware in response to the application of rules to the retrieved operational characteristics. The use of a rules engine to manage the operation of message oriented middleware, however, it not without limitation.

In particular, as the rules engine is typically removed from the message oriented middleware, data exchanged between the two using interprocess communications is slow, since a network round trip is required. Therefore, there is usually an incentive to minimize the amount of data passed, to the control station, thus, effectively limiting the amount of information available to the control station. In the alternative, a rules engine accessing an application programming interface (API) to the message oriented middleware addresses some of the concerns in respect to slow data exchanges. However, to the extent that the rules engine and message oriented middleware are separate, with the rules engine being maintained by a completely separate group of developers from the developers maintaining the messaging oriented middleware, there are practical difficulties to making the rules engine work effectively with the messaging component and delays in upgrading the rules engine to account for new features in the messaging oriented middleware often arise.

BRIEF SUMMARY OF THE INVENTION

Embodiments of the present invention address deficiencies of the art in respect to the management of message oriented middleware and provide a novel and non-obvious method, system and computer program product for the integration of a rules engine with message oriented middleware. In an embodiment of the invention, a method for managing a messaging component in message oriented middleware has been provided. The method includes creating shared memory in the memory of a computer and adding or deleting tokens in the shared memory corresponding to objects such as messages and message queues, created in and removed from, respectively, in a messaging component of message oriented middleware, or topics or subscriptions or log file space for messages queues in the messaging component. The method additionally includes applying rules in a rules engine to the tokens in the shared memory. Finally, the method includes directing management operations in the messaging component responsive to the applied rules by the rules engine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a message processing system configured with an integrated rules engine for managing a messaging component in message oriented middleware. In accordance with an embodiment of the invention, a rules engine can be coupled to a messaging component within message oriented middleware. A working memory of the rules engine can be established in shared memory of the message oriented middleware and tokens can be created and removed in the working memory by the messaging component to correspond to the creation and removal of objects such as message queues, messages in message queues, topics, subscriptions or log file space for message queues in the messaging component. The rules engine in turn can apply management rules to the tokens in the working memory in order to direct management actions in the messaging component.

As a result of the tight coupling of the rules engine to the messaging component using the working memory in the shared memory, the rules engine can provide an alternative view of messaging data allowing for more flexibility in the management of the message oriented middleware. Further, as the rules engine through a sharing of the working memory with the messaging component becomes part of the message oriented middleware, the rules engine has open access to the data known to the messaging system. Of import, based upon the tight coupling of the rules engine with the messaging component, the rules engine is not limited by communications latencies in detecting conditions in the messaging component.

Figure 1:
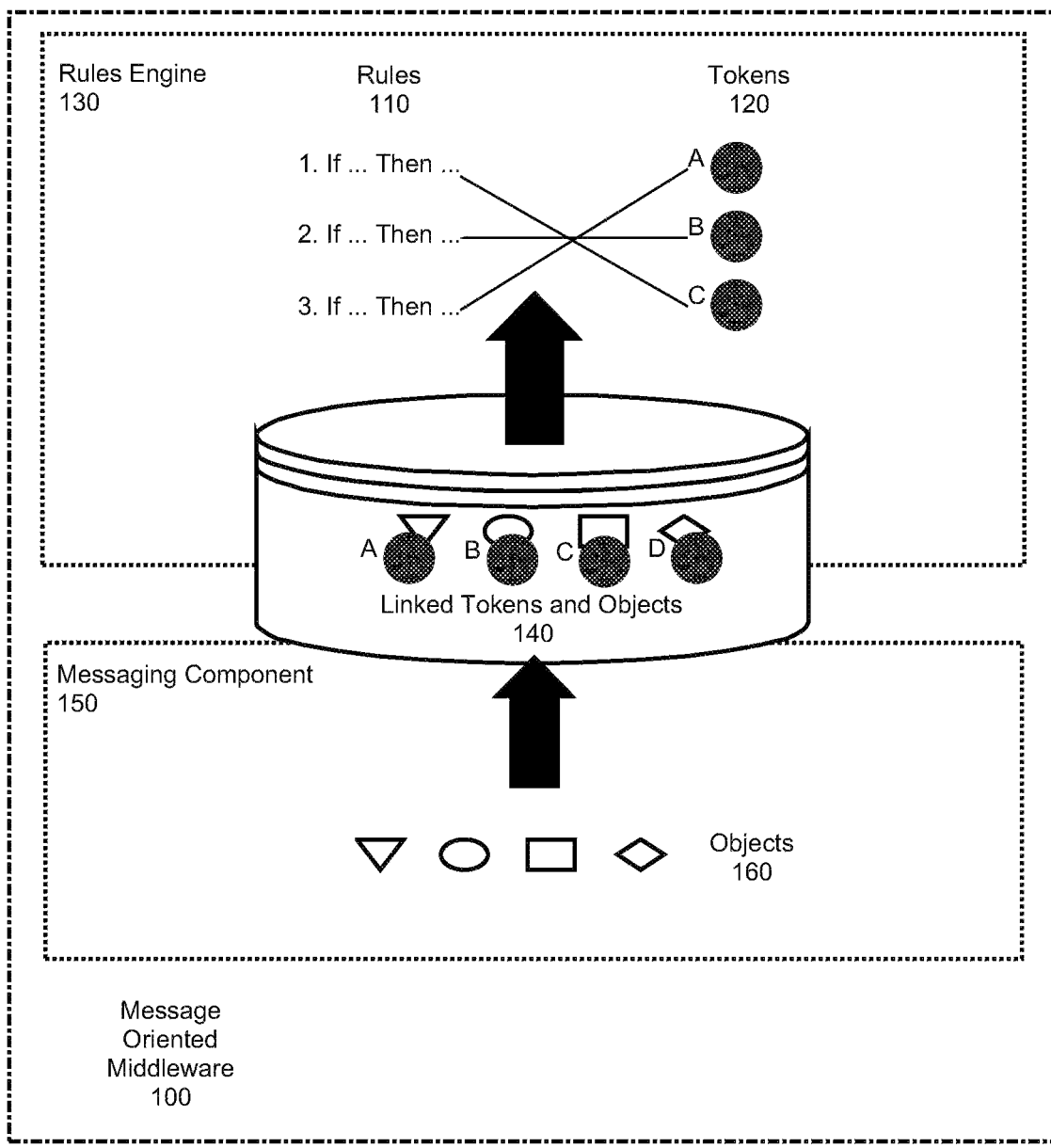
FIG. 1 is a pictorial illustration of a process for managing a messaging component in message oriented middleware.

In further illustration, FIG. 1 is a pictorial illustration of a process for managing a messaging component in message oriented middleware. As shown in FIG. 1, message oriented middleware 100 can include both a messaging component 150 and a rules engine 130 coupled to the messaging component 150 by way of shared memory 140. Messaging component 150 can manage different objects 160 subsisting in the message oriented middleware 160, for example message queues, messages in message queues, topics or subscriptions or log file space for message queues and the like. Messaging component 150 further can create in the shared memory 140, tokens 120 each token corresponding to one of the objects 160. The rules engine 130, in turn, can monitor the shared memory 140 and can apply rules 110 to the tokens 120 in the shared memory 140. In this way, the rules 110 of the rules engine 130 can be applied without delay to changes in the objects 160 reflected by corresponding changes in the tokens 120.

Figure 2:
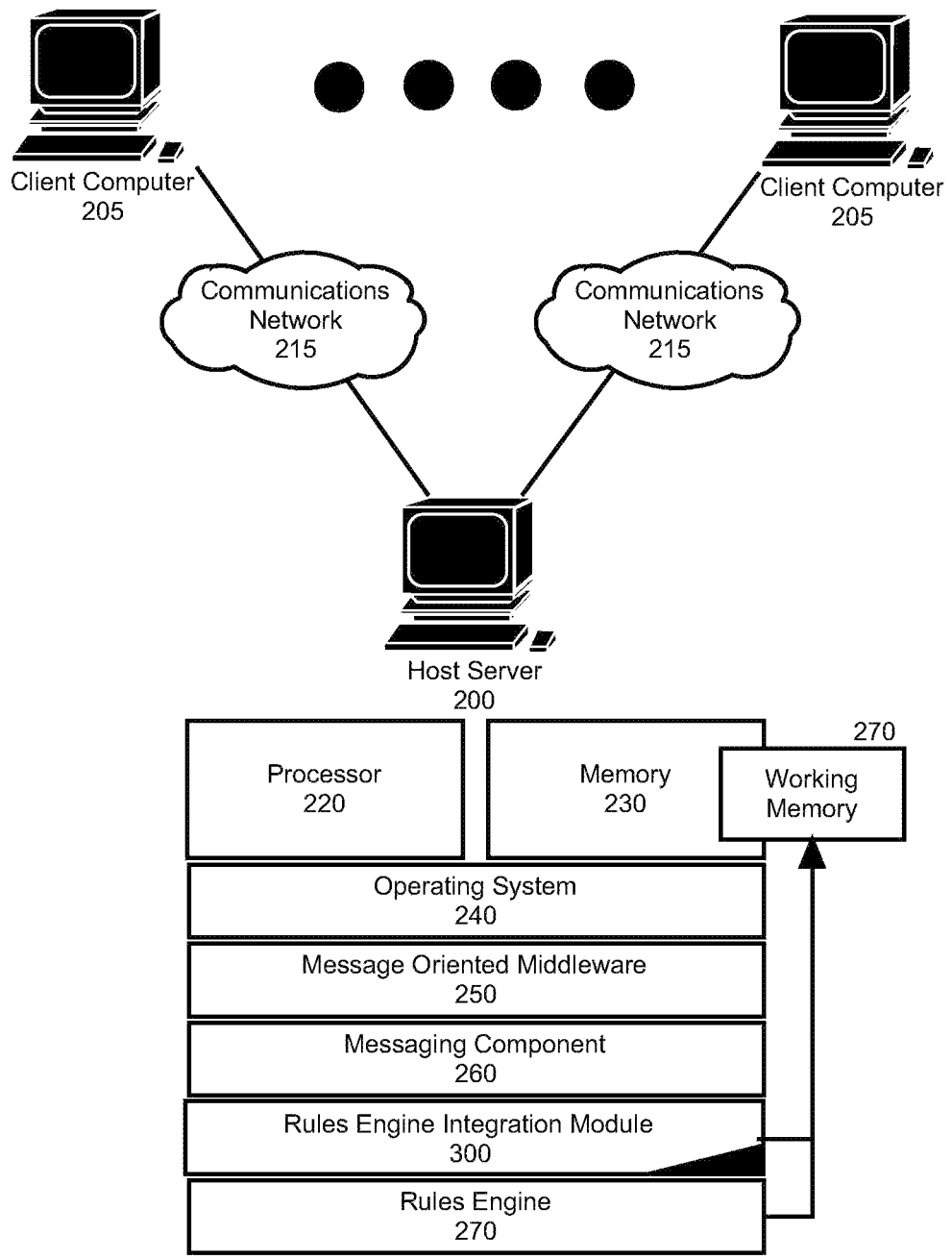
FIG. 2 is a schematic illustration of a message processing system configured with an integrated rules engine for managing a messaging component in message oriented middleware; and, FIG. 3 is a flow chart illustrating a process for managing a messaging component in message oriented middleware.

The process described in connection with FIG. 1 can be implemented within a message data processing system. In yet further illustration, FIG. 2 schematically shows a message data processing system configured with an integrated rules engine for managing a messaging component in message oriented middleware. The system can include a host server 200 configured for communicative coupling to different client computers 205 over computer communications network 215. The host server 200 can include at least one processor 220 and memory 230 supporting the execution of operating system 240. The operating system 240 in turn can host the operation of message oriented middleware 250 that includes at least one messaging component 260 managing message exchanges in one or more message queues (not shown).

As shown in FIG. 2, rules engine 270 can be coupled to the messaging component 260 and can apply one or more messaging component management rules (not shown) to tokens in working memory 270 in order to direct management operations in the messaging component 260. Of note, a rules engine integration module 300 can be coupled to the messaging component 260. The module 300 can include program code enabled to monitor the creation, deletion and modification of objects in the messaging component 260 such as message queues or messages within message queues, or topics or subscriptions or log file space for message queues, and to maintain corresponding tokens in the working memory 270. In this way, the rules engine 270 can apply the rules to the tokens when changes occur in the tokens which contemporaneously relate to objects in the messaging component 260.

Figure 3:
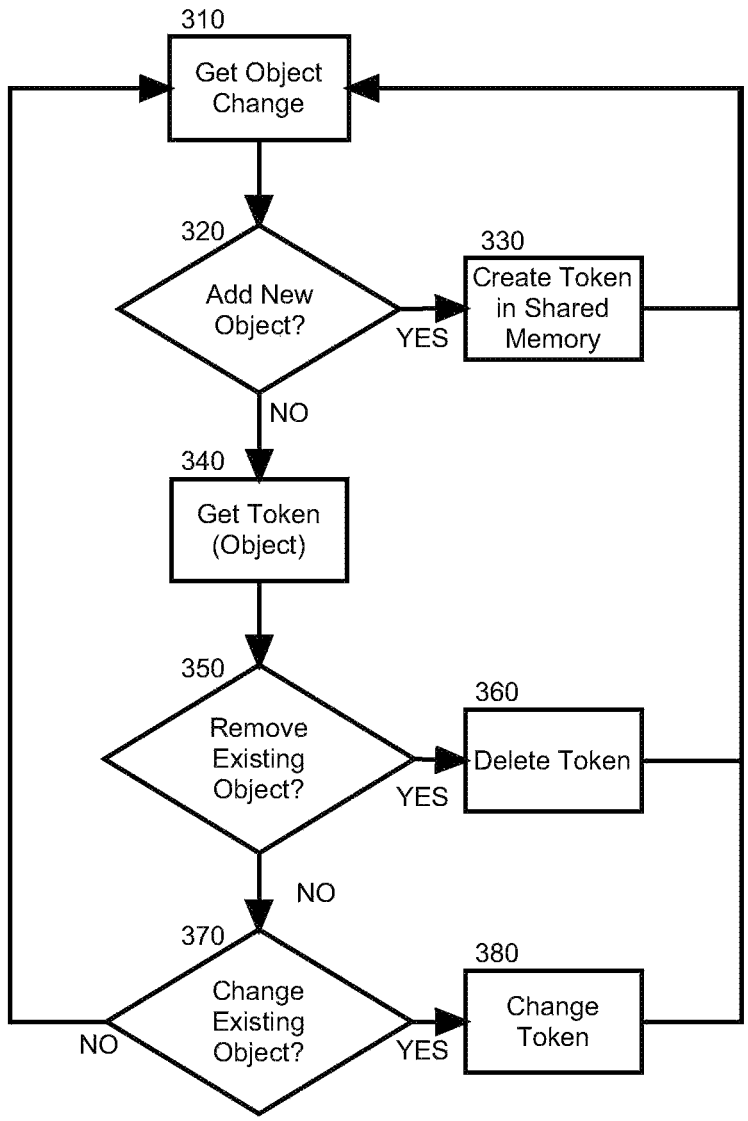
Figure 3:
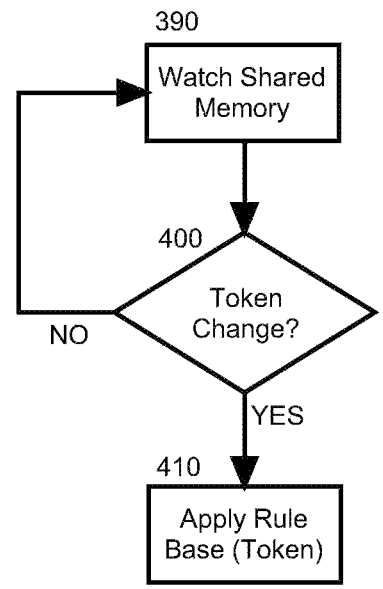

In yet further illustration of the operation of the rules engine integration module 300, FIG. 3 is a flow chart illustrating a process for managing a messaging component in message oriented middleware. As shown in FIG. 3, the messaging component and rules engine can act asynchronously to contemporaneously communicate object changes in the messaging component through the use tokens of shared memory so that the rules engine can respond to changes in the tokens with the application of one or more management rules to the tokens to direct management operations in the messaging component. Beginning in block 310, a change can be detected in an object in the messaging component. In block 320, it can be determined if the change is the addition of a new component. If so, in block 330 a corresponding token can be created in shared memory. Otherwise, the process can continue through block 340.

In block 340, a token corresponding to the changed object can be selected in the shared memory. Thereafter, in decision block 350, it can be determined whether or not the change to the object in the messaging component is the removal of the object. If so, in block 360 the selected token can be removed from shared memory. Otherwise, in decision block 370 it can be determined whether or not the change to the object is a modification of the characteristics of the object. If so, in block 380 a corresponding indication of the modification of the characteristics can be applied to the selected token in shared memory.

Concurrently with the operation of the messaging component, in block 390 the rules engine can monitor changes to tokens in the shared memory. In decision block 400, it can be determined whether or not a token in shared memory has changed. If so, in block 410, one or more rules can be applied to the token to determine a course of action to be directed in the messaging component by the rules engine.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A message processing data processing system comprising:
   a host computer with at least one processor and memory;
   shared memory established within the memory of the host computer;
   a messaging component managing a plurality of message queues in the memory;
   a rules engine applying a plurality of rules to tokens in the shared memory and directing management operations in the messaging component responsive to the applied rules by the rules engine; and, a rules engine integration module coupled to the messaging component, the module comprising program code enabled to perform:
  establishing working memory in the shared memory;
  detecting a change in the messaging component;
  determining if the change corresponds to an addition of an object to the message component and, on condition the change corresponds to an addition of a new object to the message component, creating a token in the working memory, but on condition the change corresponds to a deletion of an existing object from the message component, deleting a token from the working memory, and on condition the change corresponds to a change to an existing object of the message component that is not a deletion of the existing object, applying a change to an existing token in the working memory;
  observing the working memory to detect changes in one or more tokens in the working memory; and,
  in response to detecting a change to one or more of the tokens in the working memory, applying management rules, by the rules engine, to the tokens in the working memory in order to direct management actions in the messaging component;
  wherein the rules engine and the messaging component are coupled through the shared memory so that the rules engine has access to the data known to the messaging component without requiring interprocess communications between the messaging component and the rules engine and so that the access by the rules engine to the data is therefore not limited by network latencies.

2. The system of claim 1 wherein:
the rules engine and messaging engine further ensure that tokens in the memory correspond to objects in the messaging engine.

3. The system of claim 2 wherein:
the rules engine and messaging engine further put a message on a queue, insert a token corresponding the message in memory, and link the token to the corresponding message.

4. A computer program product for managing a messaging component in message oriented middleware, the computer program product comprising a non-transitory computer readable storage medium having computer readable program code embodied therewith, the computer readable program code performing:
  establishing working memory in shared memory of the message oriented middleware executing by a processor of a computer for use by the messaging component;
  detecting a change in the messaging component;
  determining if the change corresponds to an addition of an object to the messaging component and, on condition the change corresponds to an addition of a new object to the messaging component, creating a token in the working memory, but on condition the change corresponds to a deletion of an existing object from the messaging component, deleting a token from the working memory, and on condition the change corresponds to a change to an existing object of the messaging component that is not a deletion of the existing object, applying a change to an existing token in the working memory;
  observing the working memory to detect changes in one or more tokens in the working memory; and,
  in response to detecting a change to one or more of the tokens in the working memory, applying by a rules engine management rules to the tokens in the working memory in order to direct management actions in the messaging component;
  wherein the rules engine and the messaging component are coupled through the shared memory so that the rules engine has access to the data known to the messaging component without requiring interprocess communications between the messaging component and the rules engine and so that the access by the rules engine to the data is therefore not limited by network latencies.

5. The computer program product of claim 4 wherein:
the rules engine and messaging engine further ensure that tokens in the memory correspond to objects in the messaging engine.

6. The computer program product of claim 5 wherein:
the rules engine and messaging engine further put a message on a queue, insert a token corresponding the message in memory, and link the token to the corresponding message.

* * * * *